US011823155B2

(12) United States Patent
So et al.

(10) Patent No.: US 11,823,155 B2
(45) Date of Patent: Nov. 21, 2023

(54) APPARATUS AND METHOD FOR PROCESSING USER INFORMATION OF SMART AUTOMATED MACHINE USING FACE RECOGNITION

(71) Applicant: ATEC AP CO., LTD., Seongnam-si (KR)

(72) Inventors: Sang Hyuk So, Seoul (KR); Seung Hyun Cho, Seoul (KR)

(73) Assignee: ATEC AP Co., Ltd., Seongnam-si (KR)

( * ) Notice: Subject to any disclaimer, the term of this patent is extended or adjusted under 35 U.S.C. 154(b) by 174 days.

(21) Appl. No.: 16/918,487

(22) Filed: Jul. 1, 2020

(65) Prior Publication Data

US 2021/0004781 A1    Jan. 7, 2021

(30) Foreign Application Priority Data

Jul. 1, 2019  (KR) .......................... 10-2019-0078635
Jul. 1, 2019  (KR) .......................... 10-2019-0078649

(51) Int. Cl.
*G06Q 20/20*  (2012.01)
*G06F 9/451*  (2018.01)
(Continued)

(52) U.S. Cl.
CPC .......... *G06Q 20/206* (2013.01); *G06F 9/453* (2018.02); *G06Q 20/209* (2013.01); *G06Q 20/40145* (2013.01); *G06V 40/172* (2022.01)

(58) Field of Classification Search
CPC ............... G06Q 20/206; G06Q 20/209; G06Q 20/40145; G06F 9/453; G06V 40/172
See application file for complete search history.

(56) References Cited

U.S. PATENT DOCUMENTS

| 10,573,163 B1* | 2/2020 | Benkreira ............ G07G 1/0036 |
| 2015/0062612 A1* | 3/2015 | Nishii .................. H04N 1/4433 |
| | | 358/1.14 |
| 2022/0027886 A1* | 1/2022 | Briggs ................... G06Q 20/18 |

FOREIGN PATENT DOCUMENTS

| JP | 4699139 B2 | 6/2011 |
| KR | 10-2007-0044959 A | 5/2007 |

(Continued)

*Primary Examiner* — A. Hunter Wilder
*Assistant Examiner* — Joseph M Mutschler
(74) *Attorney, Agent, or Firm* — Saliwanchik, Lloyd & Eisenschenk

(57) ABSTRACT

Disclosed are an apparatus and a method for processing user information of a smart automated machine using face recognition, which can guide video counseling through user recognition using face recognition technique in a smart automated machine, accurately detect departure and change of a user, and control the logout based on information of departure and change of the user, thereby protecting personal information and improving security. When a transaction starts in a task control unit, face recognition monitoring is requested by interworking with a user departure/change determination unit, a face recognition solution is executed as the face recognition monitoring is requested, a user departure/change detection event is generated and transmitted to the task control unit when departure/change of the user is detected, and the logout is selectively controlled according to the departure or change to protect personal information, thereby enhancing security.

8 Claims, 6 Drawing Sheets

(51) Int. Cl.
*G06Q 20/40* (2012.01)
*G06V 40/16* (2022.01)

(56) References Cited

FOREIGN PATENT DOCUMENTS

| | | | |
|---|---|---|---|
| KR | 10-2011-0017044 A | | 2/2011 |
| KR | 10-2014-0000509 A | | 1/2014 |
| KR | 10-1456786 B1 | | 11/2014 |
| KR | 101456786 B1 | * | 11/2014 |
| KR | 10-2015-0001940 A | | 1/2015 |
| KR | 20150001940 A | * | 1/2015 |
| KR | 10-1835333 B1 | | 3/2018 |
| KR | 10-2019-0020358 A | | 3/2019 |

* cited by examiner

APPARATUS AND METHOD FOR PROCESSING USER INFORMATION OF SMART AUTOMATED MACHINE USING FACE RECOGNITION

BACKGROUND OF THE INVENTION

1. Field of the Invention

The present invention relates to an apparatus and a method for processing user information of a smart automated machine using face recognition, which can guide video counseling through user recognition using face recognition technique in a smart automated machine, accurately detect departure and change of a user, and control the logout based on information of departure and change of the user, thereby inhibiting revelation of personal information and improving security.

2. Description of the Prior Art

As digital transformation is developed, the bank teller task that has been done only through a face-to-face manner is replaced with the automated machine task (account transfer, withdrawal, deposit, bankbook clearing, etc.), which is performed in an untack manner through automated machines installed in a bank without facing bank tellers. In this case, the untack real-name verification is performed through at least two of essential authentication means, such as submission of a copy of identification card, video call, confirmation upon delivery of access medium (real transaction confirmation), account utilization (designated account transfer), and bio-verification.

Recently, in the financial market, a smart automated teller machine (STM) capable of performing the automated teller machine (ATM) task as well as the bank teller task is spreading according to the development of digital transformation.

Korean Unexamined Patent Publication No. 10-2019-0020358 (published on Mar. 4, 2019 and entitled Financial Device, Financial Device Control Method and Financial System) discloses a financial device, which includes a body having a medium input/output unit for depositing and withdrawing a medium, a display unit provided in the body to display a repair selection unit for activating a repair service function such that the repair selection unit can be selected, a storage box in which items subject to the repair service are stored, a communication unit which is communicatively connected to a service terminal for supporting the repair service for the stored items, and a control unit for opening the storage box when the repair selection unit is selected in the display unit. When it is confirmed that the items are stored in the storage box, the control unit transmits storage information about the items to the service terminal. Through the above configuration, the financial device can perform the repair service in addition to the financial transaction service.

In addition, Korean Unexamined Patent Publication No. 10-2014-0000509 (published on Jan. 3, 2014 and entitled Method and System for Issuing Check Cards Using Financial Automation Device) discloses a method including the steps of receiving check card application information having customer information and storing the check card application information in a temporary database, receiving the check card application information from a customer terminal and displaying a check card application page for requesting a check card on a screen in response to the check card application information, creating a check card application based on customer information, account number and password when the account number and password of the customer are input through the check card application page, and transmitting a check card issuance command to a financial automation device after completing the application for the check card based on the check card application when a signature is signed in the check card application. Through the above procedure, the check card is issued by using the financial automation device.

In addition, according to Japanese Patent Registration No. 4699139 (registered on Mar. 11, 2011 and entitled Security System), during use of equipment by a user having qualifications to use the equipment, when the face of the user can no longer be detected from an image acquired by a camera, warning is issued through voice and screen display. When the user cannot be detected within a predetermined period of time, a computer is automatically locked to inhibit the computer from being used by other users, thereby improving security.

However, although the above-mentioned typical smart financial automation device and the financial automation devices disclosed in the patent documents can be applied for the repair service or check card application service that is performed through the bank teller in addition to the normal financial automation service, senior citizens with low digital informatization capabilities cannot easily use the financial automation devices and it is more convenient for the senior citizens to deal with the above services through the bank teller in a face-to-face manner. In addition, when there is departure or change of the user during the transaction, personal information may be revealed, but the above financial automation devices are weak for protecting the personal information.

In other words, the smart financial automation devices can be used by all age groups, but it is difficult for the senior citizens with low digital informatization capabilities to handle the work through direct manipulation of many menus that enable to handle the bank teller tasks/ATM tasks.

As a result, such a difficulty in use may act as a barrier for the popularization of the smart financial automation devices, thereby inhibiting the spread of smart financial automation devices.

In addition, the typical smart financial automation device is equipped with a procedure in which the transaction is restarted from the beginning due to a short timeout if the information input from the user is not entered within a predetermined time during use, so it is necessary to spend a lot of time for the transaction if the user does not respond promptly in the task that requires a lot of time due to the nature of the bank teller task.

Further, the typical smart financial automation device frequently requires authentication in the task such as the bank teller task, and the user needs to input additional authentication for real-name verification, causing inconvenience in use.

In addition, although it is possible to automatically lock the computer upon departure of the user during the transaction, it is impossible to respond to the change of the user during use so that personal information may be revealed.

SUMMARY OF THE INVENTION

Therefore, the present invention has been proposed to solve various problems occurring in the typical smart automation device and the related arts as described above, and an object of the present invention to provide an apparatus and a method for processing user information of a smart automated machine using face recognition, which can guide video counseling through user recognition using face recognition technique in a smart automated machine, accurately detect departure and change of a user, and control the logout based on information of departure and change of the user, thereby inhibiting revelation of personal information and improving security.

In order to accomplish the above object, an embodiment of the present invention provides an apparatus for processing user information of a smart automated machine, the apparatus including: a camera unit that photographs an image for user recognition when a transaction starts according to a transaction request of a user; a user recognition unit for recognizing a user face image photographed by the camera unit; a user departure/change determination unit that stores the user face image recognized by the user recognition unit and determines departure/change of the user during the transaction; and a task control unit that automatically controls a logout when the departure or change is detected by the user departure/change determination unit during the transaction, and collectively controls tasks requiring authentication.

The apparatus for processing user information of a smart automated machine according to an embodiment of the present invention may further include a voice transmission unit that transmits voice for the transaction, and broadcasts a departure announcement for maintaining transaction continuity under control of the task control unit when the departure of the user occurs during the transaction.

The camera unit may include a face recognition camera that photographs a face of the user for determining user departure, user change, and additional authentication.

The user departure/change determination unit may register a user image by using a face recognition solution when the transaction starts under control of the task control unit, continuously analyze the user image to monitor the departure and change of the user until the transaction is completed, and transmit a detection event for the departure or change of the user to the task control unit when the departure or change of the user is detected.

The task control unit may control an announcement broadcast for the departure of the user when a user departure event occurs from the user departure/change determination unit during the transaction, and automatically logout and switch to an initial screen to protect personal information when the user does not return within a preset time.

The task control unit automatically and immediately logout and switch to an initial screen to protect personal information when a user change event occurs from the user departure/change determination unit during the transaction.

When additional authentication is required during the transaction, the task control unit may interwork with the user departure/change determination unit and regard that the additional authentication has been performed when a user departure/change event does not occur during the transaction even if the additional authentication is not made.

In order to accomplish the above object, another embodiment of the present invention provides an apparatus for processing user information of a smart automated machine, the apparatus including: a user detection unit provided in a body to detect an access of a user; a camera unit provided in the body to photograph an image for video counseling or user recognition; a user recognition unit that recognizes a face image of the user photographed by the camera unit and outputs age estimation information; a video counseling guidance unit that guides a connection to a video counseling when the user is determined as a senior citizen based on the age estimation information output from the user recognition unit; a task control unit that controls the camera unit to photograph the face image of the user when the access of the user is detected by the user detection unit, and controls the connection to the video counseling in association with the video counseling guidance unit; and a customer interworking unit that outputs a screen for guiding the video counseling under control of the task control unit and transmits manipulation information of the user to the task control unit.

The camera unit may include a video counseling camera for photographing an image of a user during the video counseling; and a face recognition camera that photographs a face of the user to estimate an age of the user.

When age estimation information indicates the senior citizen, the video counseling guidance unit may generate screen information to guide the connection to the video counseling and display the screen information on the customer interworking unit through the task control unit to guide the video counseling.

When the user recognition is terminated while performing the face recognition solution for estimating the age of the user according to user detection, the task control unit may ignore a result of the user recognition of the user recognition unit and switch to an initial screen or switch to a task based on an input of the user.

The termination of user recognition may be determined when the input of the user occurs before the age estimation of the user, the user is not detected, or the user recognized by the face recognition camera is changed.

In order to accomplish the above object, an embodiment of the present invention provides a method for processing user information of a smart automated machine to protect personal information by controlling a logout through detection of departure/change of a user in the smart automated machine, the method including: (a) requesting face recognition monitoring by interworking with a user departure/change determination unit when a transaction starts in a task control unit built in the smart automated machine; (b) executing a face recognition solution when the face recognition monitoring is requested by the user departure/change determination unit, and generating and transmitting a user departure/change detection event to the task control unit when departure/change of the user is detected; and (c) selectively controlling the logout by the task control unit according to the departure or change to protect personal information when the user departure/change detection event is received during a transaction.

Step (b) may include: (b1) executing the face recognition solution and acquiring a right for camera control; (b2) registering a user image acquired through the user recognition unit; (b3) monitoring the departure or change of the user in real time by comparing the image acquired through the user recognition unit with the registered user image; (b4) generating a user departure/change detection event when the departure or change of the user is detected in step (b3); and (b5) finishing the face recognition solution and returning back the right for camera control when a completion of the face recognition monitoring occurs from the task control unit.

Step (c) may include: (c1) when the user departure/change detection event is received during the transaction, checking whether the received event is a user departure detection event by the task control unit, and transmitting a return guidance voice to maintain transaction continuity when the received event is the user departure detection event; and (c2) checking an elapse of time after transmitting the return guidance voice, automatically logging out to switch to an initial screen in order to protect personal information when a release of the user departure detection event does not occur within a preset time, and simultaneously transmitting a termination signal of the face recognition monitoring to the user departure/change determination unit.

Step (c) may include: (c3) when the user departure/change detection event is received during a financial transaction, checking whether the received event is a user change detection event by the task control unit, and immediately and automatically controlling the logout to protect the personal information when the received event is the user change detection event.

In addition, the method for processing user information of a smart automated machine according to an embodiment may further include: (d) when additional authentication is required while performing a financial transaction in the task control unit, interworking with the user departure/change determination unit and regarding that the additional authentication has been performed when a user departure/change event does not occur during the transaction even if the additional authentication is not made.

In addition, the method for processing user information of a smart automated machine according to another embodiment may include:
- (a) transmitting a predetermined basic guide voice when an access of a user is detected by a user detection unit built in a smart automated machine for a predetermined time or longer;
- (b) executing a face recognition solution for user recognition, acquiring a right for controlling a face recognition camera to photograph a face of the user, and estimating an age of the user by analyzing the photographed face image of the user, by a user recognition unit;
- (c) returning back the right for camera control and finishing the face recognition process when the estimation of the age of the user is completed, and transmitting a result of the face recognition to a task control unit;
- (d) guiding a video counseling by the task control unit in association with a video counseling guidance unit that guides a connection to the video counseling when the estimated age group of the user indicates a senior citizen; and
- (e) performing a task through the video counseling by controlling a video counseling camera and a customer interworking unit using the task control unit when the user selects the video counseling in step (d), and switching to a normal task screen when the user does not select the video counseling.

Step (b) may include (b1) executing a face recognition solution and acquiring a right for camera control; (b2) estimating an age group of the user by analyzing an image acquired through the face recognition camera; (b3) returning back the right for camera control estimation of the age group of the user is complete; and (b4) transmitting the face recognition result to the task control unit.

In step (b4), if it is not a human face as a result of the face recognition, if the face recognition is not performed for a predetermined period of time or more, or when a camera failure occurs, the face recognition result may be output as a face recognition error. When the age group of the user is estimated, estimation information for the age group of the user may be output as a result of face recognition.

In step (b4), when the estimation information for the age group of the user indicates a senior citizen, screen information that guides the connection to the video counseling may be generated and displayed on the customer interworking unit through the task control unit to guide the video counseling In addition, the method for processing user information of a smart automated machine according to another embodiment may further include:
- (f) ignoring the result of the user recognition of the user recognition unit, and switching to an initial screen or switching to the task according to an input of the user when a termination of a user recognition occurs while recognizing the face image of the user through the face recognition solution.

The termination of the user recognition may be determined the user input occurs before the estimation of the age group of the user, the user is not detected for a predetermined period of time, or the user recognized by the face recognition camera is changed. When the user input occurs, the process may be switched to the task corresponding to the user input, and if the user is not detected for a predetermined period of time or more or the user is changed, the initial screen may be displayed to improve security.

According to the present invention, the smart automated machine can detect departure/change of the user during a transaction using the face recognition technique, and automatically logout upon the departure/change of the user, thereby inhibiting revelation of personal information of the user.

In addition, according to the present invention, when the additional authentication is required while handling the transactions successively due to the nature of the bank teller tasks, it is possible to substitute departure/change detection information of the user for the additional authentication during the additional authentication procedure, so the additional authentication can be omitted, thereby allowing the user to more promptly and conveniently handle the financial transactions.

Further, according to the present invention, senior citizens can be recognized by using the face recognition technique in the smart automated machine, and the recognized senior citizens can be guided for video counseling, so that the senior citizens with low digital informatization capabilities can conveniently use the smart automated machine.

In addition, according to the present invention, all age groups can conveniently use the smart automated machine, so the present invention can contribute to the popularization and spread of the smart automated machines.

DETAILED DESCRIPTION OF THE INVENTION

Figure 1:
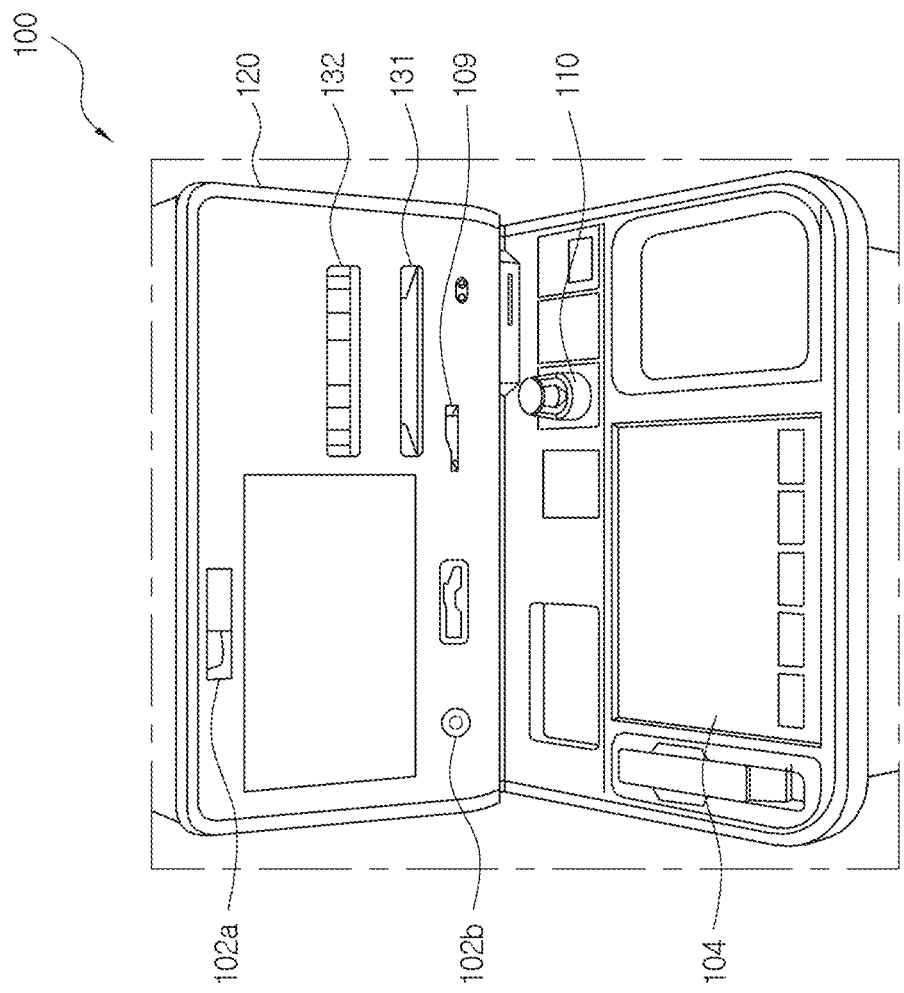
FIG. 1 is a schematic view showing an apparatus for processing user information of a smart automated machine using face recognition according to the present invention.

Hereinafter, an apparatus and a method for processing user information of a smart automated machine using face recognition according to an exemplary embodiment of the present invention will be described in detail.

Terms or words used in the specification and claims should not be limited to be interpreted in general and lexical meanings, and should be construed as having meanings and concepts consistent with the technical idea of the present invention based on the principle that the inventor can appropriately define the concept of the term to describe his or her invention in the best way.

Therefore, embodiments shown in the specification and the configuration shown in the drawings are only exemplary embodiments of the present invention that do not represent all of the technical idea of the present invention, and it should be understood that various equivalents and modifications that can substitute for the embodiments at the filing of the present disclosure are within the scope of the claims of the present disclosure.

Figure 2:
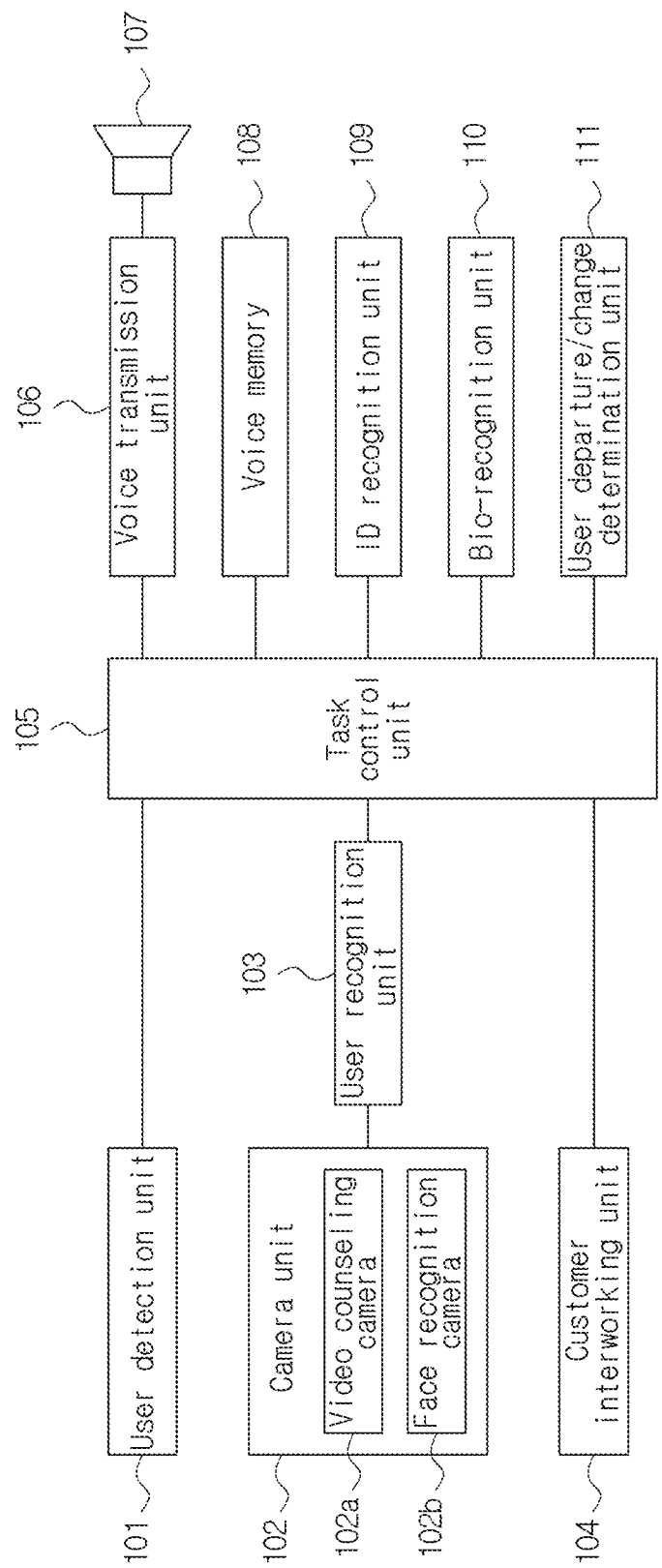
FIG. 2 is a block diagram showing an embodiment of an apparatus for processing user information of a smart automated machine using face recognition according to the present invention.

FIG. 1 is a schematic view showing an apparatus for processing user information of a smart automated machine using face recognition according to the present invention and FIG. 2 is a block diagram showing an embodiment of the apparatus for processing user information of the smart automated machine using face recognition according to the present invention.

The apparatus for processing user information of the smart automated machine using face recognition according to the present invention may include a body 120 provided therein with a camera for face recognition and the like, as well as various devices that perform tasks requiring authentication (also referred to as bank teller tasks) and automation tasks, and a user detection unit 101 that detects an access of the user may be provided in the body 120.

The smart automated machine may be a device that processes automation tasks in a financial institution, a financial company, a government office, a general company, and the like, for example, may be a "smart automated teller machine (STM)" used in the financial company.

The tasks requiring the authentication may include the bankbook open, the authentication of biometric information, etc., and the automated tasks may include transactions such as cash deposits and withdrawals, the account transfer, etc.

The user detection unit 101 may include a proximity sensor to detect an access of the user to the body 120 of the smart automated machine 100, and a variety of known detection sensors that can detect the access of the user may also be used in addition to the proximity sensor.

The body 120 may be provided with a camera unit 102 that photographs an image for a video counseling or face recognition of the user. The camera unit 101 may include a video counseling camera 1021*a* to acquire images for the video counseling, and a face recognition camera 102*b* to acquire face images for the face recognition of the user.

In addition, the body 120 may include a user recognition unit 103 for recognizing a face image of the user photographed by the camera unit 102, a user departure/change determination unit 111 that registers the user image recognized by the user recognition unit 103 and determines departure or change of the user during a transaction, and a task control unit 105 that automatically controls the logout to inhibit the revelation of personal information of the user for enhancing the security when the departure or change of the user is detected during the transaction by the user departure/change determination unit 111 and collectively controls bank teller tasks and automation tasks that require authentication.

In addition, the body 120 may include a voice transmission unit 106 that outputs a voice for a transaction and performs a departure announcement broadcast under the control of the task control unit 105 to maintain transaction continuity when the departure of the user occurs during the transaction, and a customer interworking unit 104 for transmitting manipulation information of the user to the task control unit 105. The customer interworking unit 104 may display information and receive customer information through a single-touch display.

Further, the body 120 may include a voice memory 108 provided therein with voice or control program to be provided to the user, an identification card recognition unit 109 for recognizing identification cards presented by the user, a bio-recognition unit 110 for recognizing biometric information of the user, and a speaker 107 for transmitting a guidance voice signal to the outside.

In addition, the body 120 may have a function for recognizing information (bankbook, etc.) necessary for the bank teller task or the financial task in a normal smart automated machine or a function for organizing the bankbook.

Hereinafter, the operation of the apparatus for processing user information of the smart automated machine using face recognition according to the present invention configured as described above will be described in detail.

First, in a state where the smart automated machine 100 waits for detecting the user, when the user accesses the body 120 within a predetermined distance, the proximity sensor of the user detection unit 101 detects the access of the user and generates an event for user detection (user detection signal) to transmit the event to the task control unit 105.

When the event for the user detection occurs, the task control unit 105 is switched from the standby mode to the task mode, and transmits a basic customer guidance voice registered in advance through the voice transmission unit 106.

Then, when the user selects a specific transaction, the task control unit 105 controls to monitor the face recognition of the user in association with the user departure/change determination unit 111, and at the same time, starts the transaction selected by the user. In this case, the transaction may be a financial transaction if the smart automated machine is a financial automated machine, a government-related transaction if the smart automated machine is a government automated machine, and an insurance transaction if the smart automated machine is an insurance automated machine. Therefore, in the following description, the term 'transaction' signifies the transaction suitable for the automated machine used in the field.

The user departure/change determination unit 111 may acquire a user image generated from the user recognition unit 103 and stores the user image when the request for monitoring the face recognition of the user, that is, the request for monitoring the departure/change of the user is generated from the task control unit 105. In this case, the face recognition camera 102*b* of the camera unit 102 is activated to photograph the face of the user when the transaction starts. The face recognition camera 102*b* transmits the photographed face image of the user to the user recognition unit 103. The face recognition camera 102*b* may be installed at a position capable of photographing the face of both a disabled person using a wheelchair and a normal person.

The user recognition unit 103 may pre-process the face image transmitted from the face recognition camera 102*b*, and provide only the basic face image to the user departure/change determination unit 111 through the task control unit 105.

The user departure/change determination unit 111 may execute a face recognition solution when the face recognition monitoring is requested under the control of the task control unit 105 to acquire a right of camera control, and analyze the delivered face image of the user to extract the largest face image to be registered as a user image. In this case, the face image may be extracted from the video image through a generally-known image processing algorithm that extracts and recognizes the video image such as an outline extraction or a face feature point extraction in which eyes, a nose, a mouth, and a chin are extracted from the face image acquired through the outline extraction. When a plurality of face images of the user are recognized during the image analysis, the recognition for the plurality of user face images may be notified through the task control unit 105.

When a plurality of user face images are recognized upon the face image recognition, the task control unit 105 may output the guidance text through the customer interworking unit 104 to notify the customers of the fact that a plurality of face images are recognized so it is necessary to select only one person who actually performs the financial transaction. After that, a timer may be operated, and if the face image of only one person remains within a set time (for example, 5 seconds), the transaction may be continued. Alternatively, if a plurality of face images are detected even after the set time has elapsed, the compulsive logout may be automatically performed and the initial screen may be displayed to protect personal information and transaction termination information may be provided to the user departure/change determination unit 111. Upon receiving the transaction termination information, the user departure/change determination unit 111 may terminate the face recognition solution and return back the right for camera control.

Meanwhile, if the face image of only one person remains within the set time, the user departure/change determination unit 111 may register the face image as a user image and start the monitoring for the face recognition of the user.

The user departure/change determination unit 111 may register the user image recognized through the face recognition solution, and analyze the user image continuously acquired until the transaction is terminated to monitor the departure and change of the user. When registering user image, an ID may be assigned and registered. As a method for monitoring the departure and change of the user, a face tracking technique that extracts a face image from an image acquired from the face recognition camera 102*b* in real time and compares the face image with a registered user image to check the rate of coincidence may be adopted to monitor the change of the user. In addition, when the face image is not recognized or only images other than the face are recognized through the image analysis acquired from the face recognition camera 102*b*, it is determined as the departure of the user, and when the face image recognized through the face tracking technique is different from the registered face image, it is determined as the change of the user. Then, when the departure or change of the user is detected, a detection event for the departure or change of the user may be transmitted to the task control unit 105.

When a user departure or change detection event occurs from the user departure/change determination unit 111 during the transaction, the task control unit 105 may check whether the event that occurred is a user departure event. In this case, the task control unit 105 may easily determine whether it is the departure of the user or the change of the user by assigning different IDs to the user departure event and the user change event.

When it is determined as the user departure detection event through the analysis for the event information, the task control unit 105 may perform the announcement broadcasting about the departure of the user through the voice transmission unit 106 (for example, the announcement broadcasting for recommending the user to move to a predetermined place if the user wants to perform the transaction). During the actual transaction, the user may drop his/her belongings or make a phone call, etc. Thus, the user may be spaced apart from the smart automated machine or deviate from the shooting position of the face recognition camera. In this case, if the logout is immediately carried out, the user may start the task from the beginning, causing the inconvenience to the user. In order to relieve such an inconvenience, the timer is operated when the user departure detection event occurs, and the current transaction is maintained if the user returns within a preset time (for example, 10 seconds), thereby solving the inconvenience for starting the task from the beginning. In contrast, if the user does not return within the preset time, the logout is automatically carried out and the initial screen is displayed to protect the personal information, thereby inhibiting the revelation of the personal information and improving the security.

Meanwhile, when the user change event occurs from the user departure/change determination unit 111 during the transaction, the logout is automatically and immediately carried out by the task control unit 105 and the initial screen is displayed to protect the personal information, thereby improving the security.

In addition, as another feature of the present invention, if the additional authentication is required during the transaction, the task control unit 105 interworks with the user departure/change determination unit 111 and regards that the additional authentication has been performed when the user departure/change event does not occur during the transaction even if the additional authentication is not made. That is, in the case of transactions such as bank teller tasks that require authentication, the additional authentication is performed during the transaction to enhance the security. In this case, the additional authentication may be performed through the authentication of another institution or verification of personal information. Therefore, the user needs to perform the inconvenient work for the additional authentication during the transaction. Thus, the transaction time may be increased, causing inconvenience to the user, and consequently, the additional authentication may cause a delay in the transaction time.

In this regard, according to the present invention, the determination corresponding to a real-name verification through a face-to-face manner is made when the event such as the departure or change of the user does not occur during the transaction, and the additional authentication procedure is omitted, thereby reducing the overall transaction time and solving the inconvenience of the user caused by the additional authentication procedure.

In addition, as another feature of the present invention, the task control unit 105 can substitute for the authentication, which is required for a conventional automation task, through the face recognition.

Meanwhile, the above embodiment relates to a device that processes the user information by detecting the departure and change of the user during automation tasks, and guides the video counseling when the user is a senior citizen, so that the user can use the smart automated machine more conveniently. In the following description, the term "senior citizen" means a person who is older than a predetermined age, and the criteria for determining the age of the senior citizen may vary, but it is assumed that a person aged 60 or older is referred to as the senior citizen.

Figure 3:
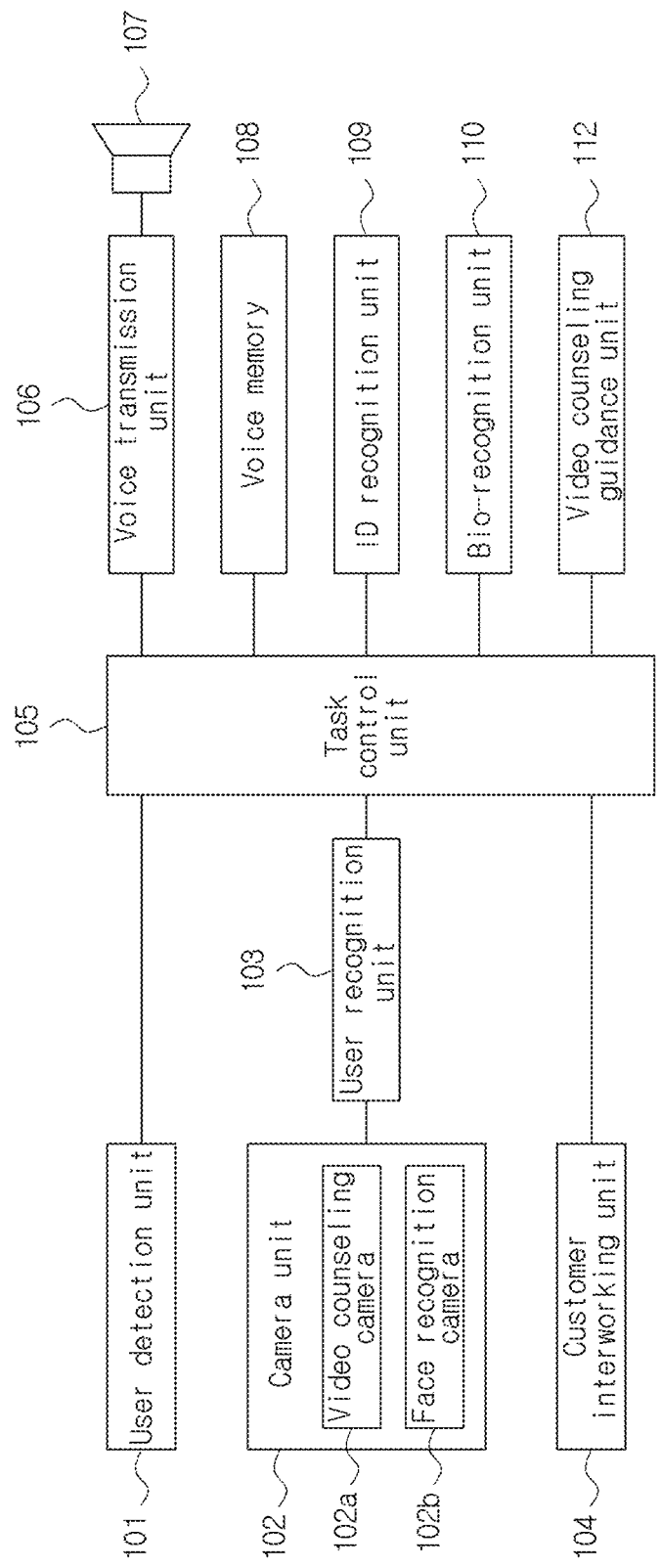
FIG. 3 is a block diagram showing another embodiment of an apparatus for processing user information of a smart automated machine using face recognition according to the present invention.

According to another embodiment of the apparatus for processing user information for guiding the video counseling for the senior citizen, as shown in FIG. 3, a body 120 may include a user recognition unit 103 that outputs age estimation information by recognizing a face image of the user photographed by a camera unit 102, a video counseling guidance unit 112 that guides the connection to the video counseling when it is determined that the user is the senior citizen with low digital informatization capability based on the age estimation information output from the user recognition unit 103, and a task control unit 105 that controls the camera unit 102 when the access of the user is detected by a user detection unit 101 to allow the camera unit 102 to photograph the face image of the user, interworks with the video counseling guidance unit 112 to control the connection to the video counseling, and collectively controls the bank teller task and the automation task. The user recognition unit 103 may have the same configuration as the user recognition unit 103 of FIG. 2, except for a function for outputting the age estimation information as a result of recognition of the face image of the user, and the task control unit 105 may have the same configuration as the task control unit 105 of FIG. 2, except for a function for controlling the connection to the video counseling.

The apparatus for processing user information of the smart automated machine for guiding the video counseling for the senior citizen may detect the user by the proximity sensor of the user detection unit 101 when the user accesses the body 120 within a predetermined distance while waiting for user detection, and generate an event for the user detection (user detection signal) to transmit the event to the task control unit 105.

When the event for the user detection occurs, the task control unit 105 is switched from the standby mode to the task mode, and transmits a basic customer guidance voice registered in advance through the voice transmission unit 106. At the same time, the user input is monitored through the customer interworking unit 104 and the face recognition camera 102b of the camera unit 102 is activated to photograph the face of the user. The face recognition camera 102b is activated to photograph the face of the user and transmits the photographed face image of the user to the user recognition unit 103. The face recognition camera 102b may be installed at a position capable of photographing the face of both a disabled person using a wheelchair and a normal person.

The user recognition unit 103 may execute a face recognition solution and analyze the transmitted face image of the user to estimate the age group (age) of the user. A conventional technique for estimating the age group through the face image may be adopted as a method for estimating the age group by analyzing the photographed face image of the user. For example, a face recognition service method disclosed in Korean Patent Registration No. 10-1835333 (invention title: method of providing face recognition service) may be used.

That is, the face image is input, a face is searched from the input face image, and face feature points are extracted by distinguishing eyes, a nose, a mouth, and a chin from the retrieved face. Then, aging feature points with a similarity value greater than or equal to a preset reference value when compared to a reference aging feature point stored and pre-matched at the location of the extracted face feature point are searched from the image. Next, after reading metadata of the retrieved aging feature points of the user and the reference aging feature point, the age group of the user is estimated using the metadata.

Age group estimation information of the user estimated as described above is transmitted to the task control unit 105.

The task control unit 105 checks the age group estimation information estimated by the user recognition unit 103, and if it is determined that the user is the senior citizen with a low level of digital informatization capability (for example, aged 60 or older), the task control unit 105 guides the video counseling in association with the video counseling guidance unit 112.

The video counseling guidance unit 112 may generate screen information to guide the connection to the video counseling when the age group of the user estimated by the task control unit 105 belongs to the senior citizen with low digital informatization capability and display the screen information on the customer interworking unit 104 in the form of a pop-up through the task control unit 105.

Figure 4:
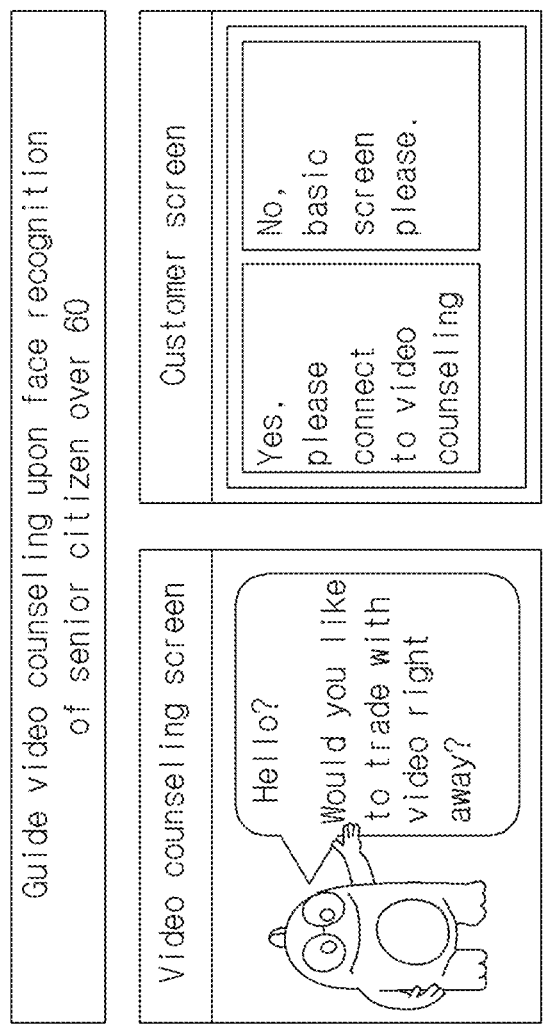
FIG. 4 is an exemplary diagram of a video counseling guidance screen according to the present invention.

FIG. 4 is an example of a video counseling guidance screen displayed on the customer interworking unit 104. The video counseling screen is displayed, and the user (customer) selects whether or not to connect to the video counseling. The user can select whether or not to connect to the video counseling by touching "Yes" or "No" on the customer screen. If necessary, the voice for the connection to the video counseling may be simultaneously output through the voice transmission unit 106 when the video counseling guidance screen is displayed on the customer interworking unit 104.

In this case, if the user selects "No", the screen is switched to the basic task screen so that the task corresponding to the input of the user may be performed. In contrast, if the user selects "Yes", the mode is switched to the video counseling mode. As the mode is switched to the video counseling mode, the video counseling camera 102a is activated so that the task is carried out in the same manner as the bank teller task in which the user may deal with the task with a staff in a face-to-face manner.

Meanwhile, as another feature of the present invention, the task control unit 105 may ignore the result of user recognition of the user recognition unit 103 and switch to the initial screen or switch to a task corresponding to the input of the user when the termination of the user recognition occurs in a state where the estimation for the age group of the user is not completed while executing the face recognition solution for estimating the age group of the user according to the user detection.

The termination of the user recognition may be determined when the user manipulates the customer interworking unit 104 before the age group of the user is estimated, when an input of the customer occurs due to an input of a card or a bankbook, when the user is not detected, or when the user recognized by the face recognition camera is changed. As a method for determining the situation where the user is not detected, when the user is not detected in a situation in which the user has been detected, a user detection operation is continuously performed for a predetermined time, and if the user is not detected for a predetermined time, the termination of the user recognition is promptly determined so that the current task is terminated and the screen is switched to the initial screen. In addition, if the user is changed in a situation where the user detection and recognition operation is continuously performed in a state in which the user is detected, the termination of the user recognition is promptly determined so that the current task is terminated and the screen is switched to the initial screen. The change of the user may be easily verified by continuously comparing previous user face recognition information with user face recognition information recognized in real time.

For example, when a plurality of face images of the user are recognized while the face recognition solution is being executed under the control of the task control unit 105, the recognition for the plurality of user face images may be notified through the task control unit 105.

When a plurality of user face images are recognized upon the face image recognition, the task control unit 105 may output the guidance text through the customer interworking unit 104 to notify the customers of the fact that a plurality of face images are recognized so it is necessary to select only one person who actually performs the financial transaction. After that, a timer may be operated, and if the face image of only one person remains within a set time (for example, 5 seconds), the transaction may be continued. Alternatively, if a plurality of face images are detected even after the set time has elapsed, the compulsive logout may be automatically performed and the initial screen may be displayed to protect personal information.

Meanwhile, if the face image of only one person remains within the set time, the face image may be registered as a user image and the monitoring for the face recognition of the user is started.

The user image recognized through the face recognition solution may be registered, and the user image continuously acquired until the transaction is terminated is analyzed to monitor the departure and change of the user. When registering user image, an ID may be assigned and registered. As a method for monitoring the departure and change of the user, a face tracking technique that extracts a face image from an image acquired from the face recognition camera 102b in real time and compares the face image with a registered user image to check the rate of coincidence may be adopted to monitor the change of the user. In addition, when the face image is not recognized or only images other than the face are recognized through the image analysis acquired from the face recognition camera 102b, it is determined as the departure of the user, and when the face image recognized through the face tracking technique is different from the registered face image, it is determined as the change of the user. Then, when the departure or change of the user is detected, a detection event for the departure or change of the user may be transmitted to the task control unit 105.

When a user departure or change detection event occurs from the user departure/change determination unit 111 during the transaction, the task control unit 105 may check whether the event that occurred is a user departure event. In this case, the task control unit 105 may easily determine whether it is the departure of the user or the change of the user by assigning different IDs to the user departure event and the user change event.

When it is determined as the user departure detection event through the analysis for the event information, the task control unit 105 may perform the announcement broadcasting about the departure of the user through the voice transmission unit 106 (for example, the announcement broadcasting for recommending the user to move to a predetermined place if the user wants to perform the transaction). During the actual transaction, the user may drop his/her belongings or make a phone call, etc. Thus, the user may be spaced apart from the smart automated machine or deviate from the shooting position of the face recognition camera. In this case, if the logout is immediately carried out, the user may start the task from the beginning, causing the inconvenience to the user. In order to relieve such an inconvenience, the timer is operated when the user departure detection event occurs, and the current transaction is maintained if the user returns within a preset time (for example, 10 seconds), thereby solving the inconvenience for starting the task from the beginning. In contrast, if the user does not return within the preset time, the logout is automatically carried out and the initial screen is displayed to protect the personal information, thereby inhibiting the revelation of the personal information and improving the security.

Meanwhile, when the user change event occurs during the transaction, the logout is automatically and immediately carried out by the task control unit 105 and the initial screen is displayed to protect the personal information, thereby improving the security.

When the user is not detected or the user is changed as described above, the current task is promptly terminated and the reset is performed, so that another person cannot access the personal information of the user through the current screen or cannot illegally use the personal information of the user by returning to the previous screen.

In addition, the task control unit 105 may check the result of face recognition of the user transmitted from the user recognition unit 103. When the analysis result represents that the face image is not a face image of a person, the face image is not detected for a predetermined period of time or more, or the face recognition is not performed due to a camera failure, the tasks of the user recognition and the connection to the video counseling may be terminated.

Figure 5:
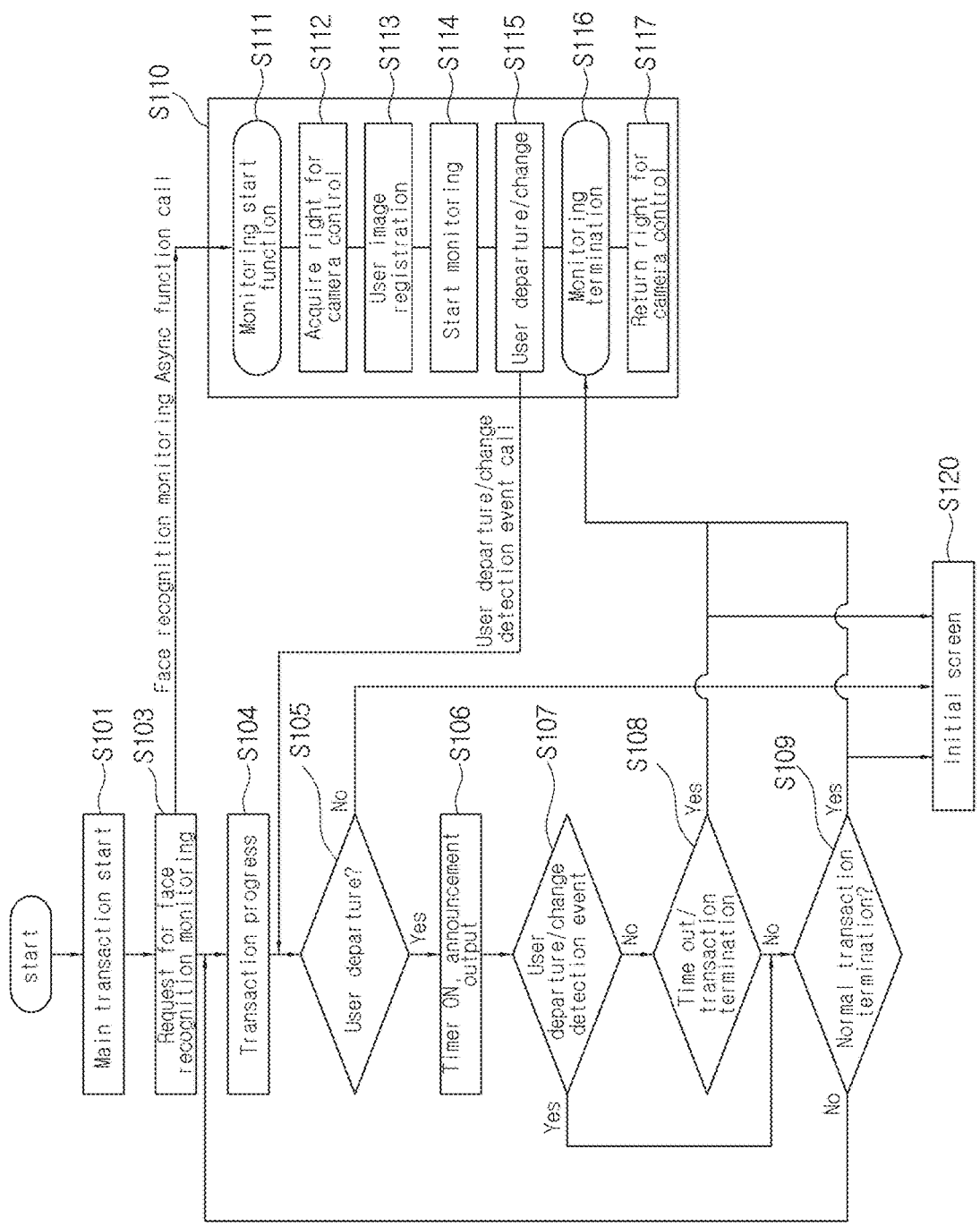
FIG. 5 is a flowchart showing an embodiment of a method for processing user information of a smart automated machine using face recognition according to the present invention.

FIG. 5 is a flowchart showing a method for processing user information by using an apparatus for processing user information of a smart automated machine according to the present invention, in which the method includes the steps of (a) requesting face recognition monitoring by interworking with a user departure/change determination unit 111 when a transaction starts in a task control unit 105 built in the smart automated machine 100 (S101-S103), (b) executing a face recognition solution when the face recognition monitoring is requested by the user departure/change determination unit 111, and generating and transmitting a user departure/change detection event to the task control unit 105 when departure/change of the user is detected (S110), and (c) selectively controlling the logout by the task control unit 105 according to the departure or change to protect personal information when the user departure/change detection event is received during a transaction (S104-S109, and S120).

Step (b) (S110) may include: (b1) executing the face recognition solution and acquiring a right for camera control (S111-S112), (b2) registering a user image acquired through the user recognition unit 103 (S113), (b3) monitoring the departure or change of the user in real time by comparing the image acquired through the user recognition unit 103 with the registered user image (S114), (b4) generating a user departure/change detection event when the departure or change of the user is detected in step (b3) (S115), and (b5) finishing the face recognition solution and returning back the right for the camera control when a completion of the face recognition monitoring occurs from the task control unit 105 (S116-S117).

Step (c) may include: (c1) when the user departure/change detection event is received during the transaction, checking whether the received event is a user departure detection event by the task control unit, and transmitting a return guidance voice to maintain transaction continuity when the received event is the user departure detection event (S104-S106), (c2) checking an elapse of time after transmitting the return guidance voice, automatically logging out to switch to an initial screen in order to protect personal information when a release of the user departure detection event does not occur within a preset time, and simultaneously transmitting a termination signal of the face recognition monitoring to the user departure/change determination unit (S107-S109), and (c3) when the user departure/change detection event is received during a financial transaction, checking whether the received event is a user change detection event by the task control unit, and immediately and automatically controlling the logout to protect the personal information when the received event is the user change detection event (S120).

In addition, although not shown in the drawings, the method of processing user information of the smart automated machine according to the present invention may further include a step of interworking with the user departure/change determination unit 111 and regarding that the additional authentication has been performed when a user departure/change event does not occur during the transaction even if the additional authentication is not made, when the additional authentication is required while performing a financial transaction in the task control unit 105.

This step may be added to step (S104) of proceeding the transaction or to step (S109) of confirming the termination of the normal transaction.

Hereinafter, the method for processing user information of the smart automated machine using face recognition according to the present invention configured as described above will be described in detail.

First, in a state in which the smart automated machine 100 waits for detecting the user, when the user accesses the body 120 within a predetermined distance, the proximity sensor of the user detection unit 101 detects the access of the user and generates an event for user detection (user detection signal) to transmit the event to the task control unit 105.

When the event for the user detection occurs, the task control unit 105 is switched from the standby mode to the task mode, and transmits a basic customer guidance voice registered in advance through the voice transmission unit 106.

Then, when the user selects a specific transaction in step S101, the task control unit 105 controls to monitor the face recognition of the user in association with the user departure/change determination unit 111, and at the same time, starts the transaction selected by the user in step S103.

In step S110, the user departure/change determination unit 111 acquires a user image generated from the user recognition unit 103 and stores the user image when the request for monitoring the face recognition of the user, that is, the request for monitoring the departure/change of the user is generated from the task control unit 105. In this case, the face recognition camera 102*b* of the camera unit 102 is activated to photograph the face of the user when the transaction starts. The face recognition camera 102*b* transmits the photographed face image of the user to the user recognition unit 103. The face recognition camera 102*b* may be installed at a position capable of photographing the face of both a disabled person using a wheelchair and a normal person. The user recognition unit 103 may pre-process the face image transmitted from the face recognition camera 102*b*, and provide only the basic face image to the user departure/change determination unit 111 through the task control unit 105.

The user departure/change determination unit 111 may execute a face recognition solution when the face recognition monitoring is requested under the control of the task control unit 105 in step S111, acquire a right of camera control in step S112, and analyze the delivered face image of the user to extract the largest face image to be registered as a user image in step S113. In this case, the face image may be extracted from the video image through a generally-known image processing algorithm that extracts and recognizes the video image such as an outline extraction or a face feature point extraction in which eyes, a nose, a mouth, and a chin are extracted from the face image acquired through the outline extraction. When a plurality of face images of the user are recognized during the image analysis, the recognition for the plurality of user face images may be notified through the task control unit 105.

When a plurality of user face images are recognized upon the face image recognition, the task control unit 105 may output the guidance text through the customer interworking unit 104 to notify the customers of the fact that a plurality of face images are recognized so it is necessary to select only one person who actually performs the financial transaction. After that, a timer may be operated, and if the face image of only one person remains within a set time (for example, 5 seconds), the transaction may be continued. Alternatively, if a plurality of face images are detected even after the set time has elapsed, the compulsive logout may be automatically performed and the initial screen may be displayed to protect personal information and transaction termination information may be provided to the user departure/change determination unit 111. Upon receiving the transaction termination information, the user departure/change determination unit 111 may terminate the face recognition solution and return back the right for camera control.

Meanwhile, if the face image of only one person remains within the set time, the user departure/change determination unit 111 may register the face image as a user image and start the monitoring for the face recognition of the user in step S114.

In step S115, the user departure/change determination unit 111 may register the user image recognized through the face recognition solution, and analyze the user image continuously acquired until the transaction is terminated to monitor the departure and change of the user. When registering user image, an ID may be assigned and registered. As a method for monitoring the departure and change of the user, a face tracking technique that extracts a face image from an image acquired from the face recognition camera 102*b* in real time and compares the face image with a registered user image to check the rate of coincidence may be adopted to monitor the change of the user. In addition, when the face image is not recognized or only images other than the face are recognized through the image analysis acquired from the face recognition camera 102*b*, it is determined as the departure of the user, and when the face image recognized through the face tracking technique is different from the registered face image, it is determined as the change of the user. Then, when the departure or change of the user is detected, a detection event for the departure or change of the user may be transmitted to the task control unit 105.

When a user departure or change detection event occurs from the user departure/change determination unit 111 during the transaction in step S104, the task control unit 105 may check whether the event that occurred is a user departure event in step S105. In this case, the task control unit 105 may easily determine whether it is the departure of the user or the change of the user by assigning different IDs to the user departure event and the user change event.

When it is determined as the user departure detection event through the analysis for the event information, the task control unit 105 may perform the announcement broadcasting about the departure of the user through the voice transmission unit 106 (for example, the announcement broadcasting for recommending the user to move to a predetermined place if the user wants to perform the transaction) in step S106. During the actual transaction, the user may drop his/her belongings or make a phone call, etc. Thus, the user may be spaced apart from the smart automated machine or deviate from the shooting position of the face recognition camera. In this case, if the logout is immediately carried out, the user may start the task from the beginning, causing the inconvenience to the user. In order to relieve such an inconvenience, the timer is operated when the user departure detection event occurs, and the current transaction is maintained if the user returns within a preset time (for example, 10 seconds), thereby solving the inconvenience for starting the task from the beginning in steps S107 and S108. In contrast, if the user does not return within the preset time, the logout is automatically carried out and the initial screen is displayed to protect the personal information, thereby inhibiting the revelation of the personal information and improving the security in step S120. When the logout is automatically carried out, the transaction termination signal may also be transmitted to the user departure/change determination unit 111. When the user departure/change determination unit 111 receives the transaction termination signal, the face recognition solution is terminated in step S116, and the right for camera control is returned back in step S117. In this case, after outputting the announcement about the user departure event, if the user departure/change detection event is released in step S107 before the set time elapses, the transaction progressing step is performed.

Meanwhile, when the user change event occurs from the user departure/change determination unit 111 during the transaction, the task control unit 105 moves to step S120 to automatically and immediately carry out the logout and switch to the initial screen in order to protect the personal information and enhance the security. Even when the logout is automatically carried out, the transaction termination signal may also be transmitted to the user departure/change determination unit 111. Upon receiving the transaction termination signal, the user departure/change determination unit 111 terminates the face recognition solution in step S116, and returns back the right for camera control in step S117.

In addition, as another feature of the present invention, if the additional authentication is required during the transaction, the task control unit 105 interworks with the user departure/change determination unit 111 and regards that the additional authentication has been performed when the user departure/change event does not occur during the transaction even if the additional authentication is not made. That is, in the case of transactions such as bank teller tasks, the additional authentication is performed during the transaction to enhance the security. In this case, the additional authentication may be performed through the authentication of another institution or verification of personal information.

Therefore, the user needs to perform the inconvenient work for the additional authentication during the transaction. Thus, the transaction time may be increased, causing inconvenience to the user, and consequently, the additional authentication may cause a delay in the transaction time.

In this regard, according to the present invention, the determination corresponding to a real-name verification through a face-to-face manner is made when the event such as the departure or change of the user does not occur during the transaction, and the additional authentication procedure is omitted, thereby reducing the overall transaction time and solving the inconvenience of the user caused by the additional authentication procedure.

FIG. 5 shows a method for processing user information by detecting departure/change of the user while using a smart automated machine, and the present invention may further includes a step of guiding the video counseling for a senior citizen based on a result of face recognition of the user, thereby allowing the user to more conveniently use the smart automated machine.

Figure 6:
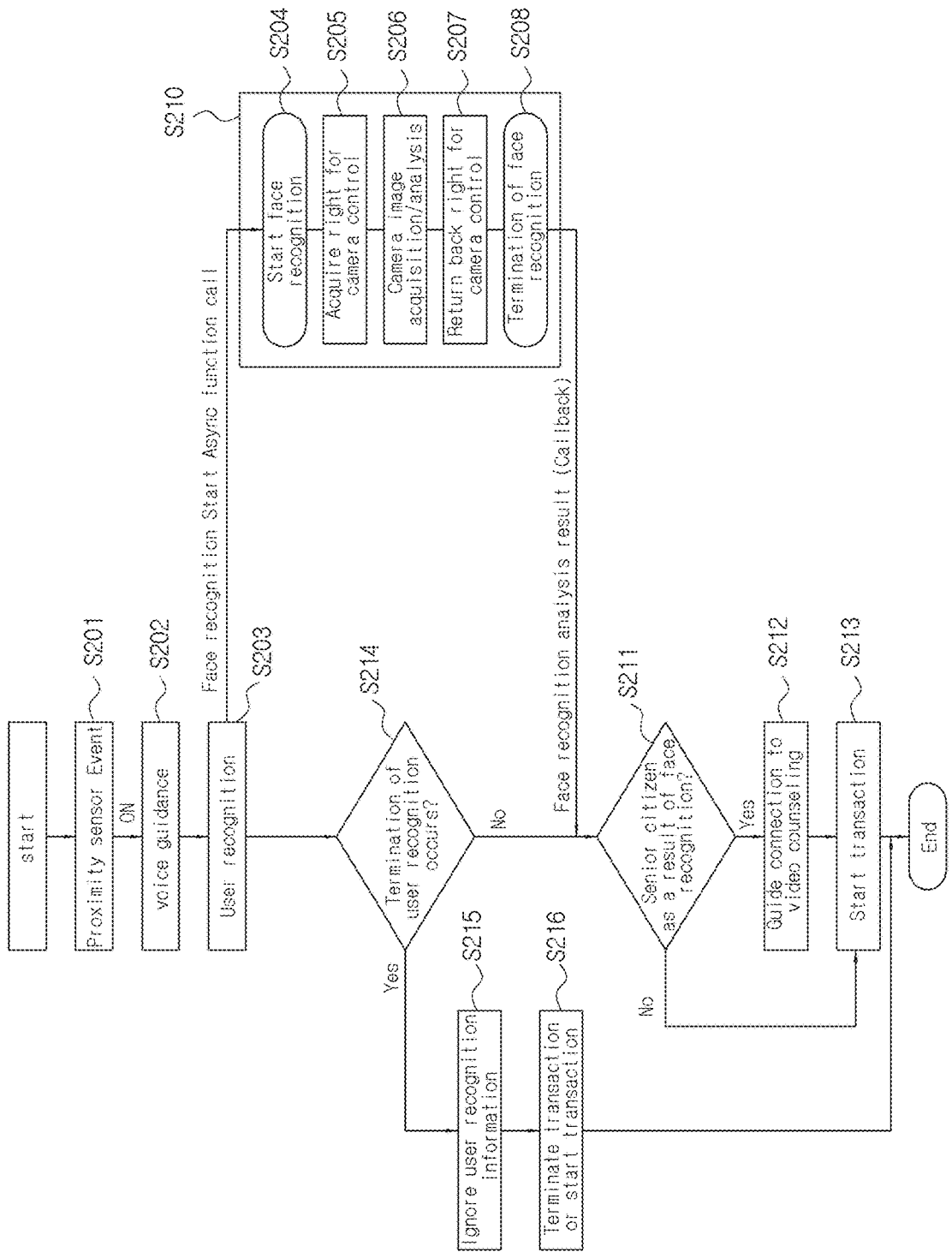
FIG. 6 is a flowchart showing another embodiment of a method for processing user information of a smart automated machine using face recognition according to the present invention.

FIG. 6 is a flowchart showing a step of guiding the video counseling for the senior citizen in the method for processing user information of the smart automated machine, in which the method includes (a) transmitting a predetermined basic guide voice when an access of a user is detected by a user detection unit 101 built in a smart automated machine 100 for a predetermined time or longer (S101-S102), (b) executing a face recognition solution for user recognition, acquiring a right for controlling a face recognition camera 102b to photograph a face of the user, and estimating an age of the user by analyzing the photographed face image of the user, by a user recognition unit 103 (S103-S106), (c) returning back the right for camera control and finishing the face recognition process when the estimation of the age of the user is completed, and transmitting a result of the face recognition to a task control unit 105 (S107-S108), (d) guiding a video counseling by the task control unit 105 in association with a video counseling guidance unit 112 that guides a connection to the video counseling when the estimated age group of the user indicates a senior citizen (S111-S112), and (e) performing a task through the video counseling by controlling a video counseling camera 102a and a customer interworking unit 104 using the task control unit 105 when the user selects the video counseling in step (d), and switching to a normal task screen when the user does not select the video counseling (S113).

Step (b) may include (b1) executing a face recognition solution and acquiring a right for camera control (S104-S105), (b2) estimating an age group of the user by analyzing an image acquired through the face recognition camera (S106), (b3) returning back the right for camera control estimation of the age group of the user is complete (S107), and (b4) transmitting the face recognition result to the task control unit 105 (S108). In step (b4), if it is not a human face as a result of the face recognition, if the face recognition is not performed for a predetermined period of time or more, or when a camera failure occurs, the face recognition result may be output as a face recognition error. When the age group of the user is estimated, estimation information for the age group of the user may be output as a result of face recognition.

In addition, the process of guiding the video counseling for the senior citizen in the method for processing user information of the smart automated machine according to the present invention may further includes a step of (f) ignoring the result of the user recognition of the user recognition unit 103, and switching to an initial screen or switching to the task according to an input of the user when a termination of a user recognition occurs while recognizing the face image of the user through the face recognition solution (S114-S116).

The process of inducing video counseling for the elderly among methods for processing user information of the smart automated machine using the face recognition configured as described above will be described in detail as follows.

Hereinafter, the process of guiding the video counseling for a senior citizen in the method for processing user information of the smart automated machine using face recognition according to the present invention configured as described above will be described in detail.

First, in step S201, in a state where the task control unit 105 of the smart automated machine 100 waits for detecting the user, when the user accesses the body 120 within a predetermined distance, the proximity sensor of the user detection unit 101 detects the access of the user and generates an event for user detection (user detection signal) to transmit the event to the task control unit 105. In this case, it is preferable to generate the event for the user detection only when the user is detected for a predetermined period of time or more.

When the event for the user detection occurs, the task control unit 105 moves to step S202 to transmit a basic customer guidance voice registered in advance through the voice transmission unit 106. Then, the task control unit 105 moves to step S203 to monitor the user input through the customer interworking unit 104 and the face recognition camera 102b of the camera unit 102 is activated to photograph the face of the user. The face recognition camera 102b is activated to photograph the face of the user and transmits the photographed face image of the user to the user recognition unit 103. The face recognition camera 102b may be installed at a position capable of photographing the face of both a disabled person using a wheelchair and a normal person.

In step S210, the user recognition unit 103 executes a face recognition solution and analyzes a transmitted face image of the user, thereby estimating the age group (age) of the user. A conventional technique for estimating the age group through the face image may be adopted as a method for estimating the age group by analyzing the photographed face image of the user.

For example, a face recognition service method disclosed in Korean Patent Registration No. 10-1835333 (invention title: method of providing face recognition service) may be used.

That is, the face recognition is started by using the face recognition solution in step S204, the right for camera control is acquired in step S205, and the age group of the user is estimated in step 206 by analyzing the image acquired through the face recognition camera using the face recognition method disclosed in the face recognition service of the above Patent Document. Next, when the user age group estimation is completed, the right for camera control is returned back in step S207, and the face recognition solution is terminated after transmitting the face recognition result to the task control unit 105 in step S208.

If it is not a human face as a result of the face recognition, if the face recognition is not performed for a predetermined period of time or more, or when a camera failure occurs, the face recognition result may be output as a face recognition error. When the age group of the user is estimated, estimation information for the age group of the user may be output as a result of face recognition.

In step S211, the task control unit 105 checks the age group estimation information estimated by the user recognition unit 103, and if it is determined that the user is the senior citizen with a low level of digital informatization capability (for example, aged 60 or older), the task control unit 105 moves to step S212 to guide the video counseling in association with the video counseling guidance unit 112. The video counseling guidance unit 112 may generate screen information to guide the connection to the video counseling when the age group of the user estimated by the task control unit 105 belongs to the senior citizen with low digital informatization capability and display the screen information on the customer interworking unit 104 in the form of a pop-up through the task control unit 105. FIG. 4 is an example of a video counseling guidance screen displayed on the customer interworking unit 104. The video counseling screen is displayed, and the user (customer) selects whether or not to connect to the video counseling. The user can select whether or not to connect to the video counseling by touching "Yes" or "No" on the customer screen. If necessary, the voice for the connection to the video counseling may be simultaneously output through the voice transmission unit 106 when the video counseling guidance screen is displayed on the customer interworking unit 104. In this case, if the user selects "No", the screen is switched to the basic task screen so that the task corresponding to the input of the user may be performed. In contrast, if the user selects "Yes", the mode is switched to the video counseling mode. As the mode is switched to the video counseling mode, the video counseling camera 102a is activated so that the task is carried out in the same manner as the bank teller task in which the user may deal with the task with a staff in a face-to-face manner.

Meanwhile, as another feature of the present invention, the task control unit 105 may move to step S215 in which the task control unit 105 may ignore the result of user recognition of the user recognition unit 103 and switch to the initial screen or switch to a task corresponding to the input of the user when the termination of the user recognition occurs as in step S214 in a state where the estimation for the age group of the user is not completed while executing the face recognition solution for estimating the age group of the user according to the user detection.

The termination of the user recognition may be determined when the user manipulates the customer interworking unit 104 before the age group of the user is estimated, when an input of the customer occurs due to an input of a card or a bankbook, when the user is not detected, or when the user recognized by the face recognition camera is changed. As a method for determining the situation where the user is not detected, when the user is not detected in a situation in which the user has been detected, a user detection operation is continuously performed for a predetermined time, and if the user is not detected for a predetermined time, the termination of the user recognition is promptly determined so that the current task is terminated and the screen is switched to the initial screen. In addition, if the user is changed in a situation where the user detection and recognition operation is continuously performed in a state in which the user is detected, the termination of the user recognition is promptly determined so that the current task is terminated and the screen is switched to the initial screen. The change of the user may be easily verified by continuously comparing previous user face recognition information with user face recognition information recognized in real time.

When the user is not detected or the user is changed as described above, the current task is promptly terminated and the reset is performed, so that another person cannot access the personal information of the user through the current screen or cannot illegally use the personal information of the user by returning to the previous screen, thereby enhancing the security.

In addition, the task control unit 105 may check the result of face recognition of the user transmitted from the user recognition unit 103. When the analysis result represents that the face image is not a face image of a person, the face image is not detected for a predetermined period of time or more, or the face recognition is not performed due to a camera failure, the tasks of the user recognition and the connection to the video counseling may be terminated.

As described above, according to the present invention, the age group can be estimated through the face recognition of the user, and when the estimated age group belongs to the senior citizen with low digital informatization capability, the connection to the video counseling is guided so that the task is carried out in the same manner as the bank teller task in which the user may deal with the task with a staff in a face-to-face manner, thereby allowing the senior citizen with low digital informatization capability to conveniently use the smart automated machine.

Although the present invention made by the present inventors has been described in detail according to the above embodiments, the present invention is not limited to the above embodiments and those skilled in the art may comprehend that various changes can be made without departing from the subject matter of the present invention.

The invention claimed is:

1. An apparatus for processing user information of a smart automated machine, the apparatus comprising:
   a camera unit configured to capture an image for user recognition when a transaction starts according to a transaction request of a user;
   a user recognition unit configured to recognize a user face image captured by the camera unit;
   a user departure/change determination unit that stores the user face image recognized by the user recognition unit and determines departure/change of the user during the transaction; and
   a task control unit that automatically controls a logout when the departure or change is detected by the user departure/change determination unit during the transaction, and collectively controls tasks requiring authentication,
   wherein the user departure/change determination unit assigns different IDs to a user departure event and a user change event, respectively, when the user departure or change event occurs,
   wherein the task control unit automatically and immediately logs out and switches to an initial screen to protect personal information when a user change event is determined to occur by the user departure/change determination unit during the transaction;
   wherein, when additional authentication is required during the transaction, the task control unit interworks with the user departure/change determination unit and regards that the additional authentication has been performed by automatically replacing additional authentication with the user departure/change event without performing the additional authentication when the user departure/change event does not occur during the transaction; and
   wherein the task control unit controls transmission of a guide message for allowing only one person who actually performs the transaction to remain when a plurality of faces are recognized upon face recognition.

2. The apparatus of claim 1, further comprising a voice transmission unit that transmits voice for the transaction, and broadcasts a departure announcement for maintaining transaction continuity under control of the task control unit when the departure of the user occurs during the transaction.

3. The apparatus of claim 1, wherein the camera unit includes a face recognition camera configured to capture an image of a face of the user for determining user departure, user change, or requirement for additional authentication.

4. The apparatus of claim 1, wherein the user departure/change determination unit registers a user image by a face recognition solution when the transaction starts under control of the task control unit, continuously analyzes the user image to monitor the departure and change of the user until the transaction is completed, and transmits a detection event for the departure or change of the user to the task control unit when the departure or change of the user is detected.

5. The apparatus of claim 1, wherein the task control unit controls an announcement broadcast for the departure of the user when a user departure event is determined to occur by the user departure/change determination unit during the transaction, and automatically logs out and switches to the initial screen to protect the personal information when the user does not return within a preset time.

6. A method for processing user information of a smart automated machine to protect personal information by controlling a logout through detection of departure/change of a user in the smart automated machine, the method comprising:
   (a) requesting face recognition monitoring by interworking with a user departure/change determination unit when a transaction is started by a task control unit of the smart automated machine;
   (b) executing a face recognition solution when the face recognition monitoring is requested by the user departure/change determination unit, and generating and transmitting a user departure/change detection event to the task control unit when departure/change of the user is detected;
   (c) selectively controlling the logout by the task control unit according to the departure or change to protect personal information when the user departure/change detection event is received during the transaction;
   (d) when additional authentication is required during the transaction, the task control unit interworks with the user departure/change determination unit and regards that the additional authentication has been performed by automatically replacing additional authentication with the user departure/change event without performing the additional authentication when the user departure/change event does not occur during the financial transaction,
   wherein, in the step (b), a transmission of a guide message is controlled for allowing only one person who actually performs the financial transaction to remain when a plurality of faces are recognized upon face recognition;
   wherein, in the step (b), the user departure/change determination unit assigns different IDs to a user departure event and a user change event, respectively, when the user departure or change event occurs, and
   wherein, in the step (c), when the user departure/change detection event is received during the financial transaction in the task control unit, it is checked whether the received event is a user change detection event, and immediately and automatically controls the logout to protect the personal information when the received event is the user change detection event.

7. The method of claim 6, wherein the step (b) includes:
(b1) executing the face recognition solution and acquiring a right for camera control;
(b2) registering a user image acquired through the user recognition unit;
(b3) monitoring the departure or change of the user in real time by comparing the image acquired through the user recognition unit with the registered user image;
(b4) generating a user departure/change detection event when the departure or change of the user is detected in step (b3); and
(b5) finishing the face recognition solution and returning the right for camera control when a completion of the face recognition monitoring occurs from the task control unit.

8. The method of claim 6, wherein the step (c) includes:
(c1) when the user departure/change detection event is received during the transaction, checking whether the received event is a user departure detection event by the task control unit, and transmitting a return guidance voice to maintain transaction continuity when the received event is the user departure detection event; and
(c2) checking an elapse of time after transmitting the return guidance voice, automatically logging out to switch to an initial screen in order to protect personal information when a release of the user departure detection event does not occur within a preset time, and simultaneously transmitting a termination signal of the face recognition monitoring to the user departure/change determination unit.

* * * * *